Jan. 11, 1927.
G. W. MÜLLER
1,614,147
AUTOMATIC SUBSTATION
Filed May 11, 1926
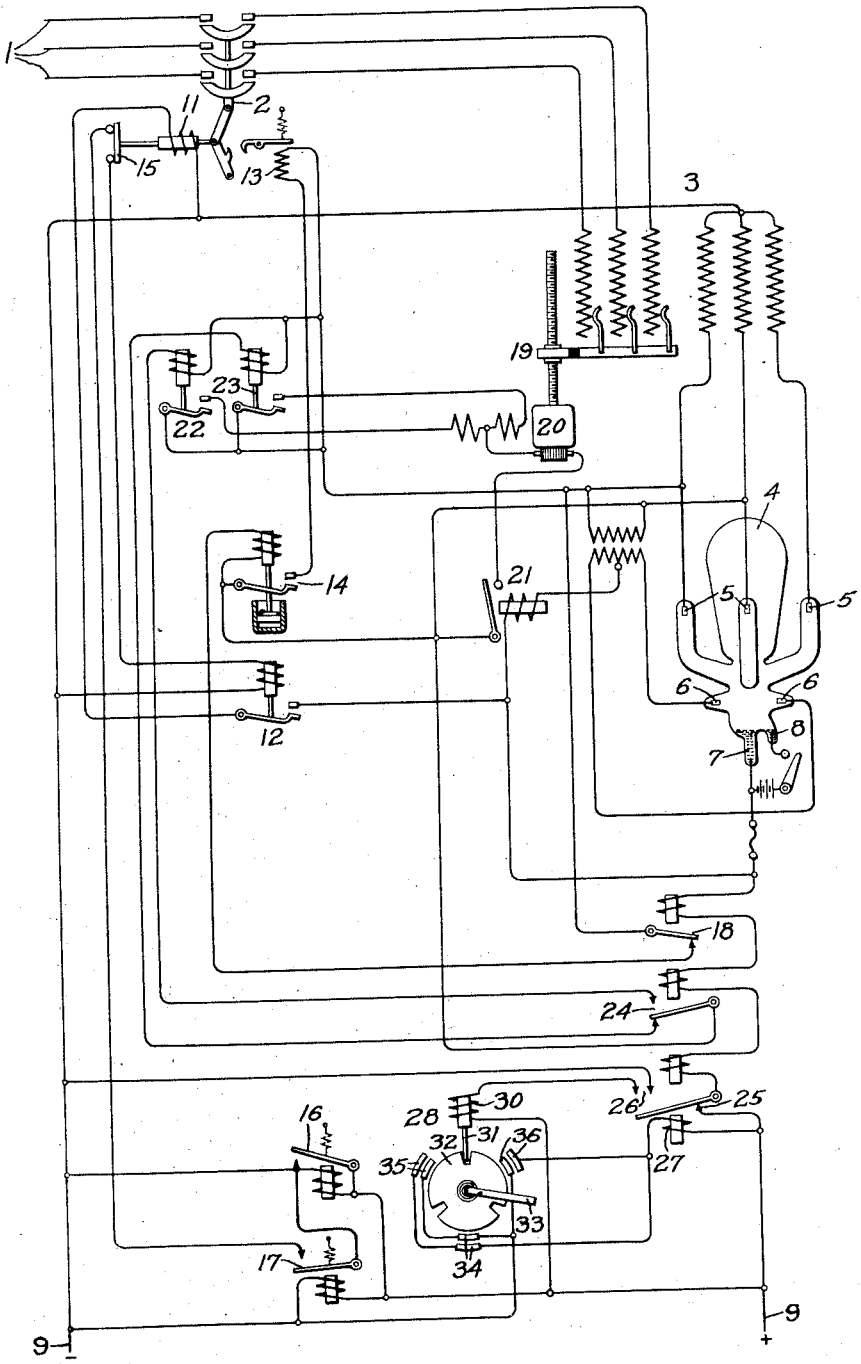
Inventor:
Gustav W. Müller,
by
His Attorney.

Patented Jan. 11, 1927.

1,614,147

UNITED STATES PATENT OFFICE.

GUSTAV W. MÜLLER, OF CHARLOTTENBURG, GERMANY, ASSIGNOR TO GENERAL ELECTRIC COMPANY, A CORPORATION OF NEW YORK.

AUTOMATIC SUBSTATION.

Application filed May 11, 1926, Serial No. 108,395, and in Germany June 6, 1925.

My invention relates to automatic sub stations comprising rectifiers, and has for its principal object the provision of an improved rectifier equipment that is provided with a regulating device controlled in accordance with the rectifier excitation, is automatically connected to and disconnected from the system in response to predetermined changes in the value of the direct current load, and is little affected by interruption of the alternating supply circuit.

My invention will be better understood from the following description when considered in connection with the accompanying drawing and its scope will be pointed out in the appended claims.

The drawing is a diagrammatic showing of a substation equipment wherein my invention has been embodied.

This equipment comprises a polyphase supply circuit 1 arranged to be connected through a main switch 2 and a transformer 3 to a rectifier 4 which is provided with anodes 5, exciting electrodes 6, a cathode 7, and a starting electrode 8. It will be readily understood that the direct current circuit terminals 9 of the equipment may be connected to a system supplied with current from other sources of direct current. The main switch 2 is operated by a closing coil 11 which is connected to the direct current circuit 9 through the contacts of a relay switch 12 and by an opening coil 13 which is connected to one phase of the secondary circuit of the transformer 3 through a time delay relay switch 14. Current for operating the relay 12 is supplied from the direct current circuit 9 through a back contact 15 of the switch 2 and through the contacts of relays 16 and 17. Current for operating the relay 14 is supplied from one secondary phase of the transformer 3 through the contacts of a relay switch 18 having its operating coil connected in the direct current circuit 9. With these connections, the closing coil 11 of the main switch 2 is energized only when the voltage of the direct current circuit 9 decreases below a value predetermined by the under voltage relay 17 and the connections of the opening coil 13 are completed only when the current of the circuit 9 exceeds a value predetermined by the relay 18.

A device 19 is provided for regulating the transformation ratio of the transformer 3 in accordance with the electrical conditions of the direct current circuit 9. This device comprises an operating motor 20 which is arranged to be connected to one secondary phase of the transformer 3 through the contacts of a relay 21 having its operating coil connected in the excitation circuit of the rectifier 4 and through the contacts of either relay switch 22 or 23. Energization of the operating coils of switches 22 and 23 is controlled by a double throw relay switch 24 which has its operating coil connected in the direct current circuit 9 and operates to vary the connections of the reversible motor 20 in accordance with the electrical conditions of the direct current circuit.

An overload relay device 25 is provided for interrupting the circuit 9 when the direct current load exceeds a predetermined value. This relay device comprises auxiliary contacts 26 and an auxiliary coil 27 through which the main contacts of the relay device are reclosed a number of times, dependent on the construction or adjustment of a circuit reclosing apparatus 28, such as a spring clock or the like. Thus, when the main contacts of the device 25 are disengaged and the auxiliary contacts 26 are interconnected through the movable member of the relay device 25, the operating coil 30 of the device 28 is energized, the member 31 is disengaged from the slot in the rotatable member 32 and the contact member 33 is moved into engagement with the contacts 34.

When this occurs, the auxiliary coil 27 partly neutralizes the effect of the main operating coil of the device 25 and the main contacts of this device are closed and will remain closed if the direct current load has decreased to its normal value. If the main contacts remain closed, the coil will remain deenergized, the member 31 will drop into the next slot of the rotatable member 32 and the contact member 33 will come to rest at a point between the contacts 34 and 35. If the direct current load is still excessive, however, the contact member 33 will be rotated successively into engagement with the contacts 35 and 36 and the main contacts of the device 25 will be reclosed a number of times dependent on the construction or adjustment of the reclosing device 28. It will be apparent that the device 28 is shown only for the purpose of illustrating the principles involved and may be replaced by any suitable means for accomplishing the reclosure of the device 25 a predetermined number of times after an overload has occurred on the direct current circuit 9.

If the rectifier 4 is out of operation and the load of the direct current circuit 9 exceeds a predetermined value, the direct current voltage will decrease sufficiently to permit closure of the under voltage relay 17 whereby the operating coil of the relay 12 is connected to the direct current circuit 9 through the contacts of relays 16 and 17 and back contact 15 of the main switch 2. Upon closure of the relay 12, the main switch closing coil is energized, the circuit 1 is connected to the transformer 3, the rectifier 4 begins to operate and the relay 21 is closed due to the exciting current supplied to the electrodes 6 of the rectifier.

As soon as the voltage of the rectifier 4 changes because of fluctuating load current transmitted through the operating coil of the double throw relay switch 24, the movable contact member of the relay 24 is moved into engagement with one or the other of its stationary contacts, the motor 20 of the regulating device 19 is connected to a phase of the transformer secondary circuit through relays 21, 22 or 23 and 24, and the transformation ratio of the transformer 3 is regulated in a manner to maintain the current of the circuit 9 within predetermined limits.

If the supply of alternating current fails while the rectifier is operating, the underload relay 18 is operated to its closed position, the regulating relay 24 is operated to its lower closed position and the overload relay 25 is maintained in its closed position. Under these conditions, neither the opening coil 13 of the main switch 2 nor the regulating apparatus 19 of the transformer 3 can be energized and the apparatus is ready to begin operation as soon as the supply of alternating current is restored. In order to avoid an incorrect regulating operation in the interval between restoration of the alternating current supply and ignition of the rectifier 4, the circuit of the regulating mechanism 19 is maintained open by the relay 21 until the arc is established between the exciting electrodes 6 and the cathode 7.

The relay 16 is so designed as to be closed only when the voltage of the direct current circuit 9 is not lower than 70 or 80 per cent of its normal value.

The regulating apparatus 19 is so adjusted that, at the highest permissible consumption of current in the direct current system, the ratio of the transformer 3 is adjusted to its highest value. If the value of the direct current increases further, the overload relay 25 interrupts the direct current circuit as previously set forth. As the direct current decreases in value the transformation ratio of the transformer 3 is decreased, and eventually the contacts of the relays 14 and 18 are closed, thereby causing the opening coil 13 to be energized and the main switch 2 to be opened. The time lag of the relay 14 is so adjusted that the regulation is operated to adjust the transformation ratio of the transformer 3 to its lowest value before the main switch 2 is opened.

The embodiment of the invention illustrated and described herein has been selected for the purpose of clearly setting forth the principles involved. It will be apparent, however, that the invention is susceptible of being modified to meet the different conditions encountered in its use and I, therefore, aim to cover by the appended claims all modifications within the true spirit and scope of my invention.

What I claim as new and desire to secure by Letters Patent of the United States is:

1. The combination of direct and alternating current circuits, a rectifier, means operable to connect said rectifier between said circuits only while the load of said direct current circuit is within predetermined limits, means for regulating the electrical conditions of said direct current circuit, and means operable in response to the exciting current of said rectifier for controlling the operation of said regulating means.

2. The combination of direct and alternating current circuits, a rectifier, means for interconnecting said circuits through said rectifier, a device connected to said alternating current circuit through said interconnecting means for regulating the electrical conditions of said direct current circuit, a relay operable in response to decrease in the load of said direct current circuit to a predetermined value, and means controlled by said relay for causing said interconnecting means to be opened at an instant following said decrease in load by a predetermined interval of time.

3. The combination of direct and alternating current circuits, a rectifier, means for interconnecting said circuits through said rectifier, and means connected to said direct current circuit for causing said interconnecting means to be closed both when the voltage of said direct current circuit decreases from its normal value to one predetermined subnormal value and when said voltage increases from another subnormal value to still another predetermined subnormal value.

4. The combination of direct and alternating current circuits, a rectifier, means for interconnecting said circuits through said rectifier, a relay connected to one of said circuits for producing closure of said interconnecting means when the voltage of said circuit decreases from its normal value to a predetermined subnormal value and a relay connected to said circuit for producing closure of said interconnecting means when the voltage of said circuit increases from one subnormal value to another predetermined subnormal value.

5. The combination of direct and alternating current circuits, a rectifier, means for interconnecting said circuits through said rectifier, means for interrupting the connections between said circuits when the load of one of said circuits becomes excessive, and means to reestablish said connection a predetermined number of times after it is interrupted.

In witness whereof, I have hereunto set my hand this 21st day of April, 1926.

GUSTAV W. MÜLLER.